(12) United States Patent
Khanka

(10) Patent No.: US 11,758,438 B2
(45) Date of Patent: *Sep. 12, 2023

(54) ENHANCING TELECOMMUNICATION QUALITY OF SERVICE

(71) Applicant: T-Mobile USA, Inc., Bellevue, WA (US)

(72) Inventor: Bhagwan Singh Khanka, Bothell, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,220

(22) Filed: Mar. 2, 2022

(65) Prior Publication Data

US 2022/0191742 A1    Jun. 16, 2022

Related U.S. Application Data

(63) Continuation of application No. 16/844,893, filed on Apr. 9, 2020, now Pat. No. 11,284,307.

(51) Int. Cl.
| | | |
|---|---|---|
| *H04W 28/24* | (2009.01) | |
| *H04W 4/02* | (2018.01) | |
| *H04L 47/80* | (2022.01) | |
| *H04L 43/08* | (2022.01) | |
| *H04L 41/5009* | (2022.01) | |
| *H04L 47/10* | (2022.01) | |
| *H04L 12/24* | (2006.01) | |
| *H04L 12/26* | (2006.01) | |

(52) U.S. Cl.
CPC ......... *H04W 28/24* (2013.01); *H04L 41/5009* (2013.01); *H04L 43/08* (2013.01); *H04L 47/10* (2013.01); *H04L 47/805* (2013.01)

(58) Field of Classification Search
CPC ..... H04W 28/24; H04L 41/5009; H04L 43/08
USPC .......................................................... 370/216
See application file for complete search history.

(56) References Cited

U.S. PATENT DOCUMENTS

| | | | |
|---|---|---|---|
| 7,454,191 B2 * | 11/2008 | Dawson ................ | H04W 4/029 455/406 |
| 8,172,154 B1 | 5/2012 | Figley | |
| 8,275,829 B2 | 9/2012 | Plamondon | |
| 8,509,816 B2 | 8/2013 | Branch et al. | |
| 8,838,819 B2 * | 9/2014 | Eidelman ................ | H04L 43/50 703/20 |
| 9,179,007 B1 * | 11/2015 | Yadav ................ | H04L 41/0893 |
| 9,654,477 B1 | 5/2017 | Kotamraju | |
| 9,762,610 B1 | 9/2017 | Kwan | |
| 11,284,307 B2 * | 3/2022 | Khanka ............... | H04L 41/0816 |

(Continued)

*Primary Examiner* — Jude Jean Gilles
(74) *Attorney, Agent, or Firm* — Summit Patents PC

(57) ABSTRACT

A telecommunications network having enhanced or optimized quality of service (QoS) based on user behavior is described herein. A user behavior profile is generated by tracking the user's use of network services with corresponding location and metric information (e.g., QoS metrics). When a user equipment (UE) of the user connects to a network site, the user behavior profile is compared to a network profile site. The network site alters or adjusts one or more operating parameters to optimize delivery of a network service based on the user behavior profile. The user behavior profile is dynamic as it is continuously or repeatedly updated one or more records of interaction.

20 Claims, 3 Drawing Sheets

(56) References Cited

U.S. PATENT DOCUMENTS

| | | |
|---|---|---|
| 2004/0029575 A1* | 2/2004 | Mehta .................. H04B 1/0003 |
| | | 455/419 |
| 2005/0276229 A1* | 12/2005 | Torabi ..................... H04L 67/51 |
| | | 370/252 |
| 2008/0034424 A1 | 2/2008 | Overcash et al. |
| 2008/0034425 A1 | 2/2008 | Overcash et al. |
| 2008/0066111 A1* | 3/2008 | Ellis ...................... G06F 3/0481 |
| | | 725/57 |
| 2008/0311885 A1* | 12/2008 | Dawson ................ H04W 4/029 |
| | | 455/406 |
| 2010/0192201 A1 | 7/2010 | Shimoni et al. |
| 2010/0199345 A1 | 8/2010 | Nadir |
| 2010/0235918 A1 | 9/2010 | Mizrahi et al. |
| 2011/0082824 A1 | 4/2011 | Allison |
| 2013/0114408 A1 | 5/2013 | Sastry et al. |
| 2013/0305357 A1 | 11/2013 | Ayyagri et al. |
| 2016/0127754 A1 | 5/2016 | Lee et al. |
| 2016/0275562 A1* | 9/2016 | Elcock ............... G06Q 30/0269 |
| 2017/0164161 A1* | 6/2017 | Gupta ..................... H04W 4/06 |
| 2018/0167402 A1 | 6/2018 | Scheidler et al. |
| 2019/0095443 A1 | 3/2019 | Chan et al. |
| 2019/0095600 A1 | 3/2019 | Chan |
| 2019/0095601 A1 | 3/2019 | Chan |
| 2019/0095702 A1 | 3/2019 | Chan |

\* cited by examiner

ENHANCING TELECOMMUNICATION QUALITY OF SERVICE

CROSS-REFERENCE TO RELATED APPLICATIONS

This application is a continuation of co-pending U.S. patent application Ser. No. 16/844,893, filed Apr. 9, 2020, the contents of which are herein incorporated by reference in their entirety.

BACKGROUND

People are habitual and tend to follow daily patterns. These daily patterns are found in both the travel of the user and the user's pattern of use of the various services of a telecommunications network throughout a day. Each user's experience with using the telecommunications network is therefore unique, since it is unlikely that other users will have the same daily patterns. The unique experience of each user means their individual experiences with the telecommunications network may differ greatly.

Some users may experience minimal to no issues with their use of the network services throughout the day, such as no dropped calls, no connectivity issues, acceptable data speeds. Since they are not experiencing any significant issues that affect their use of the network services, these users are likely satisfied with the service provided by the telecommunications network. However, other users may be dissatisfied due to issues that adversely affect their use of the network services, such as calls dropping or cutting out, slow data speed, and other issues.

The variance in the satisfaction and experiences with the telecommunications network can be due to how individual network sites are configured. Typically, each network site is configured to be optimized for an operator of the telecommunications network, rather the individual users of the network site.

What is needed is a telecommunications network having improved service for a broader customer base.

DETAILED DESCRIPTION

Figure 1:
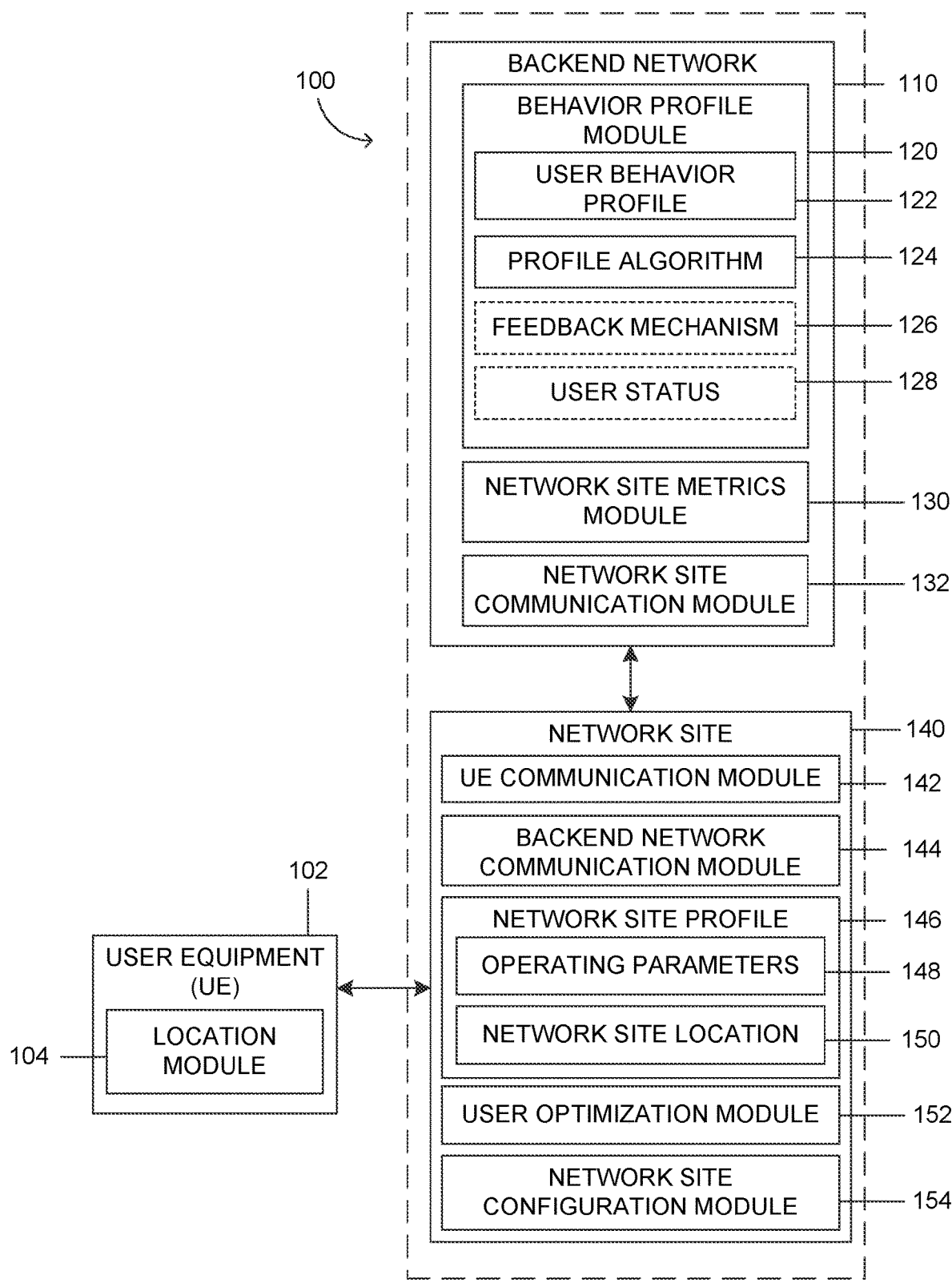
FIG. 1 illustrates an example telecommunications network.

A telecommunications network having enhanced or optimized quality of service (QoS) based on user behavior is described herein. By optimizing a network site for an individual user's network service, the individual user's experience is enhanced and the efficiency of the network can be improved. Since the network site is optimized for the individual user's particular network service, the individual user is less likely to experience noticeable issues with the service, such as a reduced rate of dropped calls and more consistent or high data speeds. The efficiency of the network can also be improved because resources of the network site are allocated to the network service being used.

Optimizing delivery of a network service is based on a user's behavior, status, or both. A user behavior profile is generated by tracking the user's use of network services with corresponding location and metric information (e.g., QoS metrics). The metric information can include, for example, average latency, minimum latency, maximum latency, median latency, throughput, setup rate, drop rate, and the like, or combinations or multiples thereof. Each network site services a geographic region, or cell, and each user equipment (UE), when within the boundary of the geographic region serviced by the network site, connects to the network site of that geographic region. The UE is authenticated to the network site and remains connected or in communication with the network site until the UE moves to a new geographic site serviced by a new network site, a handover of the UE from the previous network site to the new network site occurs and the UE is authenticated at the new network site.

When the UE of the user connects to a network site, the user behavior profile is compared to a profile of the network site. The network site alters or adjusts (e.g., increases or decreases, tilts in one or more orthogonal directions, tilts around one or more axes, the like, or combinations or multiples thereof) one or more operating parameters to optimize delivery of a network service based on the user's behavior profile. Altering the one or more operating parameters of the network site can simultaneously optimize the network site for the specific network service used or to be used by the UE, such as a voice call service, a video call service, a data service, a text messaging service, or other service provided by the telecommunications network.

The operating parameters can include, for example, tilting, transmission power, padding, retransmission, and the like, or combinations or multiple thereof. Tilting is the mechanical or electronic adjustment of an angle of an antenna of the network site. Transmission power (in decibels, or dB) is the power generated or produced by the network site at an output. Padding is the space between data sent to the UE. Retransmission is the number of times data is sent to ensure the UE receives the data.

The user behavior profile is dynamic in that the user behavior profile is continuously or repeatedly updated with information regarding the user's behavior, such as based on one or more records. The user behavior profile can be updated at a pre-determined time, pre-determined intervals, pre-determined service conditions, the like, or combinations or multiples thereof. For example, the user behavior profile can be updated at midnight every day. As another example, the user behavior profile can be updated every hour, every day, every other day, every week, every other week, every month, and the like. As yet another example, the user behavior profile can be updated each time the UE is handed off from one network site to another network site, when the UE uses a different type of service, and the like.

The user behavior profile includes records of the user's interactions (i.e., a record of an interaction of a user) with the telecommunications network. The network monitors the user's movement or location and the corresponding use of network services, such as voice call, video call, and data services. For each interaction with a network service, a record of the network service used and the location at which the network service is used is stored in the user behavior profile. Additionally, or alternatively, the route along which the user travels while using the network service is stored in the user behavior profile.

The records of the user behavior profile can also include metrics regarding the user's use, communication, engagement, interaction, or connection with the network services. The metrics can include, for example, average latency, minimum latency, maximum latency, median latency, throughput, setup rate, drop rate, and the like, or combinations or multiples thereof.

The records of the user behavior profile can also be weighted or ranked by a profile algorithm that repeatedly adjusts or updates an assigned weight or rank of the records. The profile algorithm can assign a weight or rank to a record based on a variety of factors, including, for example, how recent the record is, the location or route associated with the record, a similarity with other records, and other factors. For example, more recent records can be assigned a higher weight or rank since the more recent records are more indicative of the user's current behavior. Similarly, records having a location within a user frequented geographic area (e.g., the user's home area or the user's place of work) or a user frequented route (e.g., one or more routes between home and work, or one or more routes between at least two more frequented geographic areas) can be assigned a higher weight or rank since these record are likely to be more indicative of a routine of a user.

The record of the user behavior profile can also exhibit one or more similarities with other records, such as the use of the same network service at a similar time of day. The similarity between records can be indicative of a behavior pattern of the user and such records can be assigned a higher weight or rank due to the likelihood that the user will continue this pattern or routine.

As noted, the profile algorithm can repeatedly adjust the weight or rank of records, such as by lowering the weight or rank of older records and decreasing the weight or rank of records that are not similar to the newer records. The repeated updating of the weight or rank of each record refines the user behavior profile to be more indicative of what the user is likely or more likely to do, which helps to determine the network service the user is likely or more likely to use.

FIG. 1 shows a telecommunications network 100 including a backend network 110 and a network site 140. The backend network 110 includes a behavior profile module 120 programmed to generate, store, and update a user behavior profile 122 and to store and implement a profile algorithm 124. The backend network 110 also includes a network site metrics module 130 and a network site communication module 132. For example, the telecommunications network 100 is improved by optimizing, maximizing, or enhancing the operation, functionality, service, or combinations thereof, such as by adjusting one or more operating parameters 148 of the network site 140 based on the user behavior profile 122 and, where it is desirous to do so, a network site profile.

The user behavior profile 122 includes records of the user's interactions with the telecommunications network. The user behavior profile 122 is dynamic—the user behavior profile 122 is constantly or repeatedly adjusted or updated by the profile algorithm 124. The dynamic nature of the user behavior profile 122 permits the network site 140 to constantly or repeatedly adjust or update the operating parameters 148 to maintain an optimized service, operation, or functionality or adjust to the optimized service, operation, or functionality. The user behavior profile 122 can be updated at a pre-determined time, pre-determined intervals, pre-determined service conditions, the like, or combinations or multiples thereof. For example, the user behavior profile 122 can be updated at midnight every day. As another example, the user behavior profile 122 can be updated every hour, every day, every other day, every week, every other week, every month, and the like. As yet another example, the user behavior profile 122 can be updated every time a user equipment (UE) 102 is handed off from one network site to another, when the UE 102 uses a different type of service, and the like.

Information regarding the movements of the user through the network (i.e. moving so that the connection between the UE 102 is handed off from network site to network site) and the use of network services are recorded in the user behavior profile 122. The user's movement and use of network services can be stored as a record in the user behavior profile 122 for each interaction between the UE 102 and one or more network sites. The record also includes a time stamp or time signature of when the interaction occurred.

For example, in the morning, the user is at home and interacts with the UE 102 to use the data services (e.g., send email). The user then travels to work and interacts with the UE 102 to use the video call services (e.g., FaceTime, Zoom, Skype, Teams) while on the bus. At work, the user interacts with UE 102 to use the voice call service (e.g., make a phone call). Back at home, the user interacts with the device to use the data services (e.g., visit websites). The user behavior profile 122 can create a record for each interaction.

The user behavior profile 122 can be for a geographical region, such as the user's home area. The user can therefore have different user behavior profiles, with each behavior profile associated with a different condition or factor (e.g., day of the week, geographic area, or network service).

The profile algorithm 124 generates the user behavior profile 122 by constantly or repeatedly adjusting or updating the records of the user's interactions with the telecommunications network by changing, varying, or updating weighting or ranking of the records. The dynamic nature of the user behavior profile 122 is provided by the profile algorithm 124 which constantly or repeatedly adjusts or updates weighting or ranking of various records in the user behavior profile 122 to determine or aid in determining the anticipated or predicted network service to be used or requested by the user at any given time. The profile algorithm 124 can assign a weight or rank to a record based on a variety of factors, including, for example, how recent the record is, the location or route associated with the record, a similarity with other records, and other factors. For example, more recent records can be assigned a higher weight or rank since the more recent records are more indicative of the user's current behavior. By weighting recent actions more heavily, there is more emphasis on these recent actions when analyzing the user behavior profile to determine the anticipated network service the user will use. This allows the determination of the anticipated network service to be based on the most current habits of the user.

Similarly, records having a location within a user frequented geographic area (e.g., the user's home area or the user's place of work) or a user frequented route (e.g., one or more routes between home and work, or one or more routes between at least two of the user's more frequented geographic areas) can be assigned a higher weight or rank since these record are likely to be more indicative of a routine of a user. The home area is the geographical region the user is predominantly located in. This can be determined by or set by the cellular network, such as based on billing information or user location information. The profile algorithm 124 can account for temporary relocation of the user, such as on a vacation or trip. Records generated outside of the home area can be assigned a lower weight to deemphasize such records in the user behavior profile 122. Therefore, these records can have lower or lessened consideration within the profile algorithm 124.

Weight or rank associated with a record can be based on the similarity of the record with other records. A record that is similar to previous records, such as use of the same network service at a similar time of day, can be assigned a higher weight because the record is more likely to be indicative of the habits of the user.

The behavior profile module 120 can also include a feedback mechanism 126 and a user status 128. The feedback mechanism 126 tracks changes in user's QoS metric(s) and updates the user's behavior profile accordingly. The feedback mechanism 126 is an algorithm that continuously or repeatedly tracks QoS metrics in the records. A QoS metric trend can be tracked by common location and network service. For example, the QoS metric trend can be for voice call service at a work location of the user. The QoS metric trend can be stored as part of the QoS metric in the user behavior profile 122. The user behavior profile 122 can be updated by the feedback mechanism 126 based on newer user behavior information. During the process of optimizing the network site, as discussed below, the trends in the QoS information can be incorporated into determining whether any network site parameters need to be adjusted and, if so, by how much the network site parameter is adjusted.

The behavior profile module 120 can also include a user status 128. The user status 128 is the level of the user within the hierarchy of the operator consumer system. For example, the user status 128 can be in levels (e.g., high, medium, or low), in precious metals (e.g., platinum, gold, silver, or bronze), in jewels or gems (e.g., sapphire, ruby, or diamond), or the like.

The telecommunications network 100 also includes an access network (e.g., E-UTRAN; VoLTE; 5G NR; VoNR) which includes the network site 140 (e.g., eNodeB or gNB). The access network transmits the call or network service from the UE 102 to the backend network 110, such as to or through a data core (and from the backend network 110 to the user equipment 102, where appropriate), and handles communications between the user equipment 102 and the data core, for example, of the backend network 110.

The network site communication module 132 is programmed to permit the backend network 110 to communicate with the network site 140. The network site communication module 132 can include a data core (e.g., an evolved packet core (EPC) or 5G Core) and an IP multimedia subsystem (IMS) which includes a telephony application server (TAS) and a media resource function (MRF).

The data core is an IP-based core network infrastructure that provides packet data services, such as to support the convergence of licensed and unlicensed radio technologies. The data core can be defined around various paradigms, including mobility, policy management, and security. The four elements of the data core include a home subscriber server (HSS), a mobility management entity (MME), a serving gateway (SGW), and a packet data network gateway (PGW).

The HSS of the data core, which is in communication with the MME via a S6 interface, is a database that contains user-related information and subscriber-related information. The data core communicates (e.g., sends traffic) with the IMS via the PGW, such as via a SGi interface. In one example, at least one component of the behavior profile module 120 (e.g., the user behavior profile 122, the profile algorithm 124, the feedback mechanism 126, and the user status 128) is stored on the HSS of the data core. In another example, at least one component of the behavior profile module 120 (e.g., the user behavior profile 122, the profile algorithm 124, the feedback mechanism 126, and the user status 128) is stored on an external server or database in communication with the data core, such as via the PGW.

The backend network 110 can also include the IMS, which is an architectural framework for delivering IP multimedia services. The IMS also handles session management and media control. The IMS can communicate with a secondary network, such as a public switched telephone network, via a gateway. The IMS can also include a home subscriber server (HSS), an interrogating call state control function server (I-CSCF), and a serving call state control function server (S-CSCF). The HSS is in communication with the I-CSCF and the S-CSCG via Cx interfaces using a DIAMETER protocol. The HSS of the IMS contains user profiles, performs authentication and authorization of the user, and can provide information about the physical location of user. The S-CSCF can download or request the user profile.

In one example, at least one component of the behavior profile module 120 (e.g., the user behavior profile 122, the profile algorithm 124, the feedback mechanism 126, and the user status 128) is stored on the HSS of the IMS. In another example, at least one component of the behavior profile module 120 (e.g., the user behavior profile 122, the profile algorithm 124, the feedback mechanism 126, and the user status 128) is stored on an external server or database in communication with the IMS, such as via a breakout gateway.

The network site 140 controls the user equipment 102 within a given cell of the telecommunications network 100. For example, the network site 140 sends and receives radio transmission(s) to the UE 102 using analogue and digital signal processing functions of an access network air interface. The network site 140 also controls low-level operations of the user equipment 102 via signaling messages, such as handover commands.

The network site 140 includes a UE communication module 142 programmed to communicate (i.e., transmit a signal or data) with a user equipment 102. The UE communication module 142 can be an interface, such as a UU or e-Uu interface. The network site 140 also includes a backend network communication module 144 programmed to communicate (i.e., transmit a signal or data) with the backend network 110. The backend network communication module 144 can be an interface, such as a S1, GTP, or NG interface.

The network site 140 also includes a network site profile 146 which includes the operating parameters 148 and a network site location 150. The network site profile 146 is information or data associated with the network site 140. The network site profile 146 includes dynamic information or data (e.g., information or data that changes, varies, or is updated, including, for example, status of operating parameters 148, settings of operating parameters 148, quality of service information or metrics, user service information or data, and the like, or combinations or multiples thereof). The network site profile 146 can be derived, at least partially, from the QoS metrics, how UEs connect (and remain connected) to the network site 140, and the services used for the UEs connected to the network site 140.

In other words, the user behavior profile 122 is unique to each user, whereas the network site profile 146 is a cumulative profile—that is, the network site profile 146 is a compilation of the location of the network site 140, the services provided to and requested by the users within the cell associated with the network site 140 (including QoS metrics), and the operating parameters 148.

The operating parameters 148 are the systems or sets of conditions for the operation or functionality of a component, a device, a machine, or the like. The operating parameters 148 can include, for example, tilting, transmission power, padding, retransmission, and the like, or combinations or multiple thereof. The network site location 150 is the location of the network site 140. The network site location 150 can be designated by any appropriate location identification, including, for example, latitude and longitude, an address, a location identifier (i.e., a name, number, or both associated with a particular location within a lookup table), or the like.

The network site 140 also includes a user optimization module 152, which is programmed to determine an anticipated network service that the user will use and to optimize the network site 140 for the anticipated network service. The network site 154 also includes a network site configuration module 154 which is programmed to control operating parameters of the network site.

The user equipment (UE) 102 is any device used by an end-user, such as a caller or recipient, for communication purposes, including, without limitation, a mobile phone, a smartphone, a tablet, a personal digital assistant, a laptop with mobile connectivity, or the like. The UE 102 includes a location module 104 (e.g., GPS) which is programmed to determine and track the location of the UE 102 at any given time.

Figure 2:
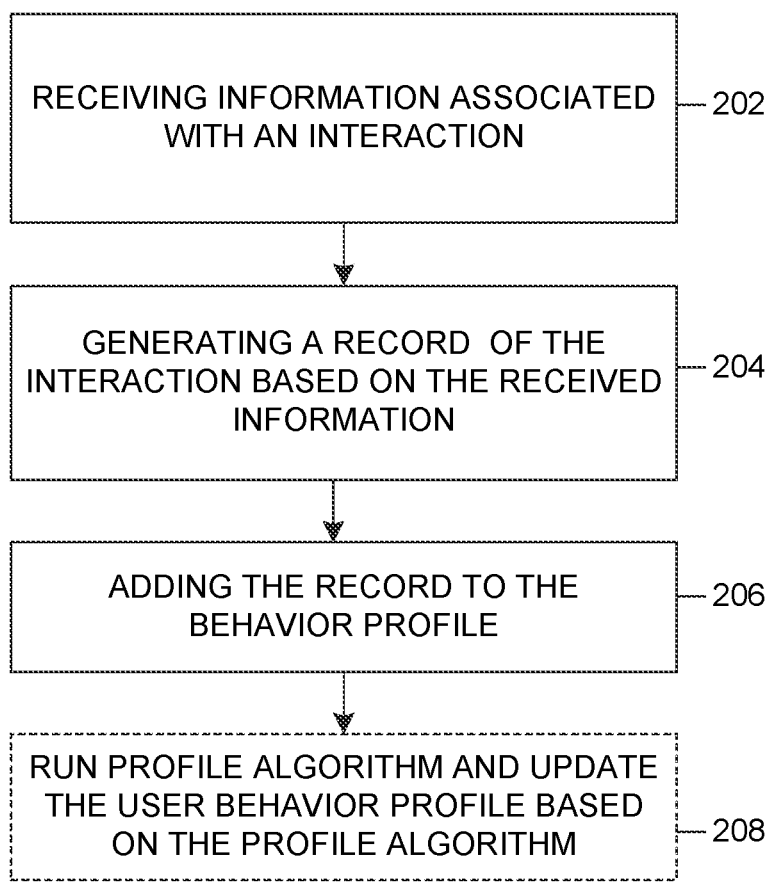
FIG. 2 illustrates an example method for generating a behavior profile of a user.

FIG. 2 shows a method 200 for generating the user behavior profile 122. At 202, the user behavior profile module 120 receives information associated with an interaction between the UE 102 and the network site 140 at which a network service has been requested or used. The information associated with the interaction can include can include the user location information, the network service information, the QoS metrics, or combinations or multiples thereof.

At 204, the user behavior profile module 120 generates a record of the interaction between the UE 102 and the network site 140. For each interaction with a network service, a record of the network service used and the location at which the network service is used is generated and stored in the user behavior profile 122. Additionally, or alternatively, the route along which the user travels while using the network service is stored in the user behavior profile 122.

The records of the user behavior profile 122 can also include metrics regarding the user's use, communication, engagement, interaction, or connection with the network services. The metrics can include, for example, average latency, minimum latency, maximum latency, median latency, throughput, setup rate, drop rate, and the like, or combinations or multiples thereof.

At 206, the record generated by the user behavior profile module 120 is added to the user behavior profile 122. At 208, the profile algorithm 124 is implemented, which causes the generated record and any previously generated records to be weighted or ranked to obtain an updated user behavior profile 212.

The profile algorithm 124 generates the user behavior profile 122 by constantly or repeatedly adjusting or updating the records of the user's interactions with the telecommunications network by changing, varying, or updating weighting or ranking of the records. The dynamic nature of the user behavior profile 122 is provided by the profile algorithm 124 which constantly or repeatedly adjusts or updates weighting or ranking of various records in the user behavior profile 122 to determine or aid in determining the anticipated or predicted network service to be used or requested by the user at any given time. The profile algorithm 124 can assign a weight or rank to a record based on a variety of factors, including, for example, how recent the record is, the location or route associated with the record, a similarity with other records, and other factors. For example, more recent records can be assigned a higher weight or rank since the more recent records are more indicative of the user's current behavior. By weighting recent actions more heavily, there is more emphasis on these recent actions when analyzing the user behavior profile to determine the anticipated network service the user will use. This allows the determination of the anticipated network service to be based on the most current habits of the user.

Similarly, records having a location within a user frequented geographic area (e.g., the user's home area or the user's place of work) or a user frequented route (e.g., one or more routes between home and work, or one or more routes between at least two of the user's more frequented geographic areas) can be assigned a higher weight or rank since these record are likely to be more indicative of a routine of a user. The home area is the geographical region in which the user is predominantly located. This can be determined by or set by the cellular network, such as based on billing information or user location information. The profile algorithm 124 can account for temporary relocation of the user, such as on a vacation or trip. Records generated outside of the home area can be assigned a lower weight to deemphasize such records in the user behavior profile 122. Therefore, these records can have lower or lessened consideration within the profile algorithm 124.

Weight or rank associated with a record can be based on the similarity of the record with other records. A record that is similar to previous records, such as use of the same network service at a similar time of day, can be assigned a higher weight because the record is more likely to be indicative of the habits of the user.

The behavior profile module 120 can also include the feedback mechanism 126 and the user status 128.

Figure 3:
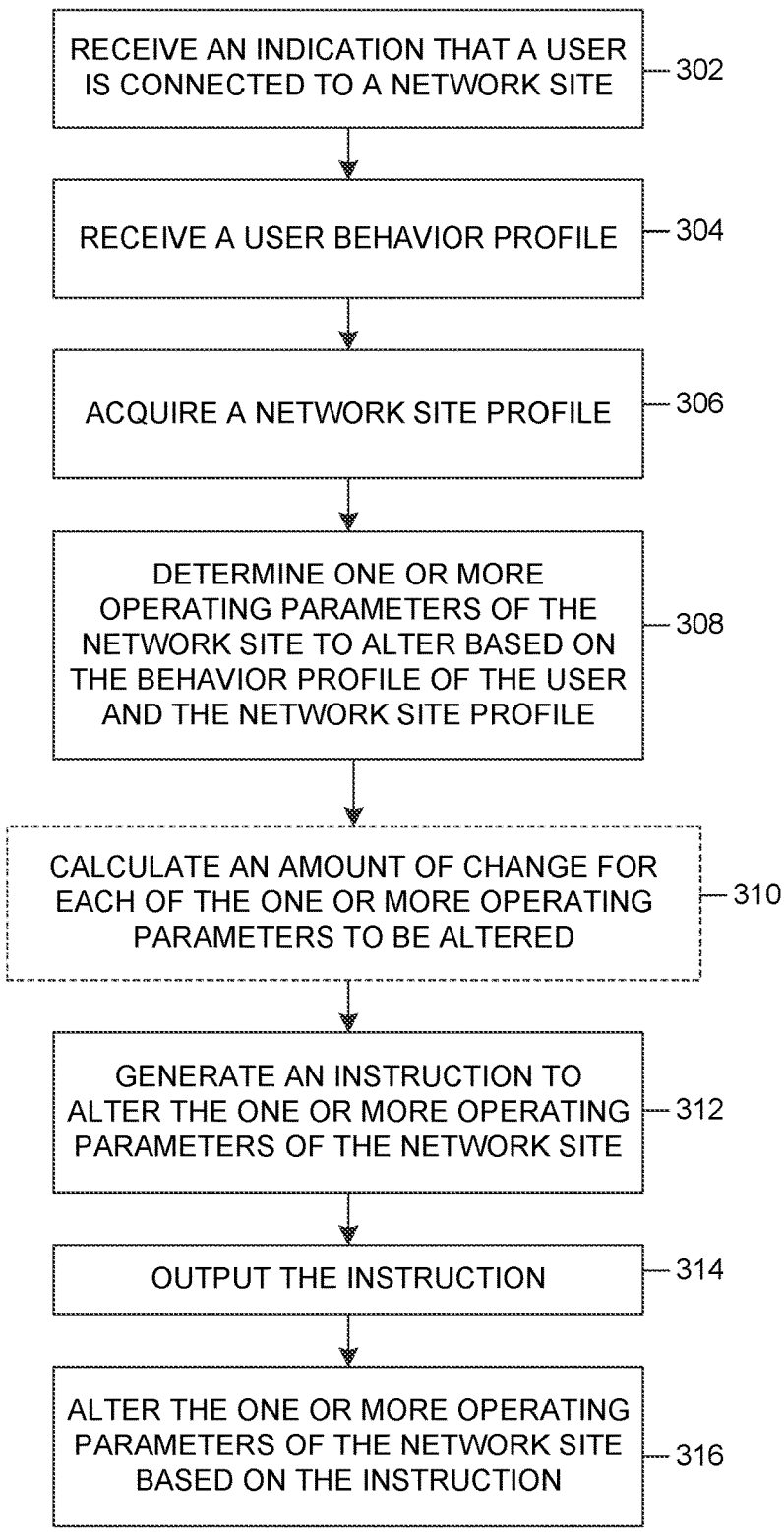
FIG. 3 illustrates an example method for adjusting one or more network site operation parameters.

FIG. 3 shows a method 300 for adjusting one or more operation parameters 148 of the network site 140. At 302, the backend network 110 receives an indication (e.g., a signal, a notification, data, or the like) that the UE 102 of the user is authenticated and connected to the network site 140. When connecting to the network site 140, the UE 120 is authenticated and is identified using a unique identifier, such as a mobile subscription identification number (MSIN). The MSIN is a unique number that the network uses to identify the UE 102. Using the unique identifier of the UE 102, the network site 140 can retrieve a corresponding user behavior profile 122 from the backend network 110.

At 304, the backend network 110, in response to the authentication and connection indication, sends the user behavior profile 122 to the user optimization module 152 of the network site 140. The user behavior profile 122 can be transmitted between the network site communication module 132 of the backend network 110 and the backend network communication module 144 of the network site 140.

At 306, the network site profile 146 is acquired by the user optimization module 152 of the network site 140, such as over a bus via one or more interfaces (when a hard drive) or via a server protocol (HTTP, HTTPS, TCP/IP when a server). In one example, the user optimization module 152 receives the network site profile 146. In another example, the user optimization module 152 retrieves the network site profile 146.

At 308, the user behavior profile 122 and the network site profile 146 are compared and analyzed, such as by the user optimization module 152, to determine an adjustment or alteration to one or more operating parameters 148 of the network site 140.

When the UE 102 connects to the network site 140, the user optimization module 152 of the network site 140 determines an anticipated network service that the user will use and then performs an optimization process to optimize itself for the anticipated network service, thereby optimizing the network site for the user's anticipated needs. The user behavior profile 122 is analyzed to determine the anticipated network service the user will use while connected to the network site 140. The analysis considers various factors, such as the current time, the location of the network site, the records within the user behavior profile 122, and the weighting or ranking of the records, such as by the profile algorithm 124, to determine the anticipated network service the user will use.

In one example, the analysis process can include a subset of the records of the user behavior profile 122 so as to have increased efficiency. For example, the network site 140 can retrieve the records of the user behavior profile 122 that are associated with the location of the network site and the current time. Being habitual, it is likely the user intends to use a network service that is routinely or previously used at a similar time of day in a location associated with the location of the network site 140.

The network site profile 146 is then analyzed based on the anticipated network service of the user behavior profile 122. The user optimized module 152 is programmed to analyze and assess how the current settings of the operating parameters 148 can affect the network service. For example, the user optimized module 152 determines which network service or network services are optimized based on the current settings of the operating parameters 148. The user optimized module 152 can then determine whether the operating parameters 148 need to be altered or adjusted for the anticipated network service of the user behavior profile 122. In other words, user optimized module 152 compares the current operating parameters 148 for a network service against the anticipated network service of the user behavior profile 122.

Based on the analysis, a determination is made to alter or adjust one or more operating parameters 148 to optimize the network site 140 to provide the anticipated network service. Additionally, the analysis can calculate a value for or change in the settings of the one or more operating parameters 148 to be altered or adjusted. For each of the one or more operating parameters 148 to be altered or adjusted, a differential between the current setting of the one or more operating parameters 148 and the value or range of values for the one or more operating parameters 148 of the user behavior profile 122 is calculated. The differential is the amount (e.g., a value, a range of values, a qualifier, or any appropriate characteristic for depicting a distinction or difference) by which the one or more operating parameters 148 is to be altered or adjusted.

The network site profile 146 can be dynamic and include a constantly updating score for each network service, indicating how optimized the network site 140 is to provide a network service. The score can be based on the operating parameters 148 of the network site 140 and how aligned the operating parameters 148 are with each of the network services. The score can be numerical and calculated or can be a classification (e.g., poor, moderate, good; high, medium, low). The score can also include consideration of the current use of the network site 140, such as the congestion the network site 140 is experiencing currently, a current prioritization of the network services (is one being favored over the others), and other factors related to the operation of the network site 140.

There can be a predetermined list of operating parameters 148 associated with each network service. For each of the operating parameters 148 on the list, there can also be value or range of values associated with each of the operating parameters 148. The determination can compare the current operating parameters 148 to the list of operating parameters 148 associated with the anticipated network service and select one or more operating parameters 148 that are not aligned between the two.

The listing of the operating parameter 148 can be weighted or ranked based on how disruptive altering a particular operating parameter 148 will be. When the operating parameter 148 is altered to optimize one network service, it can diminish the operation or functionality of other network services. For example, a text service may require less transmission power than a data service. When the anticipated network service is a text service and the transmission power is reduced as a result, the quality or functionality of the data service may be diminished due to the reduced transmission power available from the network site.

The operating parameters 148 that diminish the quality, operation, or functionality of one or all network services the least can be weighted or ranked higher, since it is more efficient to alter these operating parameters 148 than the other operating parameters 148 which are more adversely impactful. For example, if tilting does not the quality, operation, or functionality of the network services or diminishes one or more network services less than the other operating parameters, tilting can be weighted or ranked higher within the network site profile 146. The determination of the one or more operating parameters 148 to be altered can include consideration of the weight or rank of the operating parameters 148.

The user behavior profile 122, the network site profile 146, or both, can include QoS metric or trend data or information to be used by the user optimization module 152. For example, if the QoS trend is decreasing (i.e. the user's QoS metrics are decreasing), the user optimization module 152 can determine that one or more operating parameters 148 can be altered or adjusted to optimize the network site 140 for the user's anticipated network service usage, where those operating parameters 148 are different than the operating parameters 148 that were initially adjusted or altered. Or, the user optimization module 152 can determine that one or more operating parameters 148 of the network site 140 should be altered or adjusted by a greater amount, value, percentage, or the like than was initially altered or adjusted or calculated to be altered or adjusted to optimize the network site 140 for the user's anticipated network service usage. These changes to the operating parameters 148 can be made since the QoS trend information is indicating that user's experience is not improving.

As another example, if the QoS trend is increasing (i.e., the user's QoS metrics are increasing), the user optimization module 152 can determine that one or more operating parameters 148 can be altered or adjusted to optimize the network site 140 for the user's anticipated network service usage to optimize a network service, where those operating parameters 148 are different than the operating parameters 148 that were initially adjusted or altered to optimize another network service. Or, the user optimization module 152 can determine that one or more operating parameters 148 of the network site 140 should be altered or adjusted by a lesser amount, value, percentage, or the like than was initially altered or adjusted or calculated to be altered or adjusted to optimize the network site 140 for the user's anticipated network service usage. These changes to the operating parameters 148 can be made since the QoS trend information is indicating that user's experience is improving.

Tracking QoS trend allows the user optimization module 152 to correlate the change in QoS with the change to one or more operating parameters 148 made by the network site configuration module 154. To correlate the change in QoS, the user optimization module 152 can calculate a differential (e.g., a value, a range of values, a qualifier, or any appropriate characteristic for depicting a distinction or difference) between the QoS metrics before changing the one or more operating parameters 148 and after changing the one or more operating parameters 148. The differential can depict whether there was an effect on the QoS by the change in the one or more parameters 148. Therefore, the user optimization module 152 can anticipate how changing the one or more operating parameters 148 affects the QoS, such as for consideration during future or subsequent changes to the one or more operating parameters 148.

At 310, the user optimization module 152 can optionally calculate an amount of change for each of the one or more operating parameters 148 to be altered or adjusted. For each of the one or more operating parameters 148 to be altered or adjusted, a differential between the current setting of the one or more operating parameters 148 and the value or range of values for the one or more operating parameters 148 of the user behavior profile 122 is calculated. The differential is the amount (e.g., a value, a range of values, a qualifier, or any appropriate characteristic for depicting a distinction or difference) by which the one or more operating parameters 148 is to be altered or adjusted.

At 312, an instruction or signal is generated to alter or adjust the one or more operating parameters of the network site to be altered or adjusted. The instruction can be generated by the user optimization module 152. The instruction or signal can include the amount of change previously calculated for each of the one of more operating parameters 148 to be altered or adjusted. At 314, the instruction or signal is communicated to the network site configuration module 154. At 316, the network site configuration module 154 adjusts or alters the one or more operating parameter 148 based on the received instruction.

For example, when the operating parameter 148 to be adjusted or altered is tilting, the network site configuration module 154 can send a signal to a motor or actuator connected to an antenna to mechanically tilt the antenna (e.g., up, down, left right, rotate about one or more axes, the like, or combinations or multiples thereof) or electronically tilt the antenna (e.g., change direction of signal being sent to or received from the UE 102 or another device or network component). The antenna, in response to the instruction or signal, then physically tilts accordingly. As another example, when the operating parameter 148 to be adjusted or altered is power transmission, the network site configuration network 154 can send a signal to a power source of an antenna or an antenna output to change the power transmission. The power source can increase or decrease (such as by increasing or decreasing voltage or current, where appropriate) to correspondingly increase or decrease the power transmission at the output. As yet another example, when the operating parameter 148 to be adjusted or altered is padding or retransmission, the network site configuration network 154 can include an instruction to a processor to change the padding or change the retransmission to the UE 102. The processor can then change padding or retransmission settings.

However, during the optimization, making changes to an operating parameter of the network site 140 can decrease a usability of another network service (e.g., sacrificing data service for the voice call service). Similarly, adjusting or altering an operating parameter (a large change in the value of an operating parameter of the network site 140) by a given differential (e.g., a value, a range of values, a qualifier, or any appropriate characteristic for depicting a distinction or difference) or by a differential exceeding or greater than the given differential can diminish one or more other network services. An optimizing conflict can occur because optimizing for one user can affect or impact other users of the network site 140. Accordingly, a hierarchy for altering of the operating parameters 148 to minimize potential disruption to other users of the network site 140 can be established or implemented. When multiple users connect to the network site 140, the user behavior profile 122 of each user is retrieved and analyzed to determine the anticipated network services for each user. In some cases, the anticipated network services for each user can conflict, such as one user being anticipated to use the voice call service and another user being anticipated to use the data service. This presents a conflict since the network site 140 can only optimize to deliver one particular network service at a time. To resolve one or more conflicts, the hierarchy can be determined based on user status 128, network utilization, network service prioritization, the like, or combinations or multiples thereof. The conflict hierarchy or conflict management can be included in the user optimization module 152, the network site configuration module 154, or both.

For example, users can be assigned status (or priority) and the network 140 site can optimize for users based on the respective user status 128. The user can purchase status, earn status, be rewarded status (such as by a network operator), be granted permanent or temporary status based on located in a preferred geographic region, be granted permanent or temporary status based on location, or the like. The user status 128 can be in levels (e.g., high, medium, or low), in precious metals (e.g., platinum, gold, silver, or bronze), in jewels or gems (e.g., sapphire, ruby, or diamond), or the like. When the network site 140 needs to be configured based on user behavior profiles and this results in conflicting network services, the network site 140 can be optimized for a user with a higher status (e.g., high over medium; platinum over silver; diamond over ruby). The user optimization module 152 can incorporate user status hierarchy, such that the network site 140 can be optimized for the user with the higher status.

In one example, the user status 128 can be included in the user behavior profile 122. The network site 140 can retrieve or receive the user status 128 with the user behavior profile 122 or the user status 128 can be include in the user behavior profile 122.

In another example, the network site 140 can assign the user a user status, such as based on the identification of the user, the location of the user, or other user characteristics or conditions and an associated database or record that correlates the user ID with a status (e.g., a call from a hospital can receive top status or priority). Additionally, the network site profile 146 can include a procedure or process by which users of the network site 140 are assigned a status. Alternatively, the user status 128 can be assigned by the backend network 110.

As another example, the network site 140 can be optimized based on network utilization. When multiple users are connected to the network site 140, the network site 140 can access the behavior profile 122 of each user and determine an anticipated network service for each user. The network site 140 can then select a network service to optimize based on the anticipated network service of each user. The network site 140 can optimize the most common or shared anticipated network service. This conflict management option optimizes the network site 140 to handle the user demand for network services and can include a consideration of how noticeable disruptions are in each of the network services. This allows the network site 140 to be optimized based on user demand and user satisfaction.

This network utilization optimization can also include a consideration of how noticeable one or more disruptions are for each of the network services. Each network service can be assigned a value based on how noticeable disruptions are (e.g., highest score for most noticeable) and the demand for the network service (e.g., highest score for most common anticipated network service). For example, the network site 140 can select the network service to optimize by adding the values associated with the demand and noticeable disruptions and selecting the network service with the highest score. The value for the demand of the network service can also be weighted or ranked based on the percentage or number of users anticipated to use the network service (e.g., a multiplier can be applied).

As another example, the network site 140 can be optimized based on network service prioritization. When conflicts in optimization arise, the network site 140 can be optimized to deliver the network services according to the priority in the network site profile 146. This also allows the network operator to specify how to prioritize traffic through the network site 140. For example, the network operator may want to maximize the number of users served by the network site 140. The network operator can prioritize network services to maximize the number of users and can store that prioritization in the network site profile 146. The network operator can then request that the network site 140 optimize its operation based on the priority of the network profile rather than the user behavior profiles to maximize the amount of users served by the network site 140. For example, the network service prioritization can be based on the amount data used by each individual user requesting that service, such that the least data-heavy network services received top priority. As another example, the network service prioritization can be based on the network operator's pre-determined network service prioritization (e.g., voice call then text/email then data service then video calls).

Alternatively or additionally, the backend network 110 can anticipate the network services used by the user and instruct one or more network sites to optimize an aspect of its operation. For example, the user behavior profile 122 can be sent from the backend network 110 to each network site 140. As another example, the user behavior profile 122 can be handed off from one network site 140 to another network site 140 as the network service is handed off. As yet another example, the backend network 110 can send out a schedule to each anticipated network site 140 with anticipated network services and the user behavior profile 122 to permit each network site 140 to adjust based on a pre-determined or anticipated network usage. When a user connects to a network site 140, the network site 140 can query the schedule to determine which service the user is likely to need and then optimize the network site 140 to deliver the service by adjusting a network parameter.

In one example, copies of the user behavior profile 122 can be stored on one or more network sites 140 with updates being pushed to the user behavior profile module 120. The user behavior profile 122 can be stored on the network site 140 to which the user is anticipated to connect or to which the user connects the most.

In one example, optimization includes altering or adjusting parameters for various processes performed by the UE 102, including, for example, altering or adjusting criteria for handover of the UE to another network site 140/criteria for getting network resources.

In one example, the user optimization module 152 can send an instruction based on a user's status rather than the user behavior profile 122. The user can select, earn, or purchase a status, as discussed above. When the user connects to the network site 140, network site 140 can be optimized for the particular network service based on the user's status.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents:

What is claimed is:

1. A telecommunications network, comprising:
a user equipment having an associated user behavior profile, the user behavior profile including a record of an interaction of the user equipment with a network service of the telecommunications network;
a user optimization module programmed to:
receive the user behavior profile associated with the user equipment,
detect or predict the user equipment is moving towards a new network site geographic region, the new network site having a new network site profile,
in response to detecting or predicting that the user equipment is moving towards the new network site geographic region, acquire the new network site profile,
compare the user behavior profile to the new network site profile,
based on the comparison of the user behavior profile to the new network site profile, identify a feature or characteristic of an operating parameter of the new network site to alter, and
generate an instruction to cause the new network site to alter the identified feature or characteristic of the operating parameter of the new network site before or as the user equipment moves into the new network site geographic region.

2. The network of claim 1, wherein the user optimization module is further programmed to calculate an amount of change by which the operating parameter is to be altered, and wherein the instruction includes the amount of change.

3. The network of claim 1, wherein the user optimization module is further programmed to generate an instruction to cause the new network site to alter the identified feature or characteristic of the operating parameter by the amount of change.

4. The network of claim 1, wherein the record of the user behavior profile includes one or more of location information, network services information, or quality of service information corresponding to the user.

5. The network of claim 1, wherein the operating parameter includes tilt, transmission power, padding, or retransmission.

6. The network of claim 1, wherein the user optimization module is further programmed to determine a quality of service of the user equipment if the user equipment were to connect to the new network site without altering the feature or characteristic of the operating parameter of the new network site.

7. The network of claim 1, wherein the user optimization module is further programmed to determine a quality of service of the user equipment if the user equipment were to connect to the new network site with the altered feature or characteristic of the operating parameter of the new network site.

8. The network of claim 7, wherein the user optimization module is further programmed to compare the quality of service of the user equipment if the user equipment were to connect to the new network site with the altered feature or characteristic of the operating parameter of the new site to a quality of service of the user equipment if the user equipment were to connect to the new network site without altering the feature or characteristic of the operating parameter of the new network site.

9. The network of claim 8, wherein the user optimization module is further programmed to generate the instruction to cause the new network site to alter the identified feature or characteristic of the operating parameter of the new network site before or as the user equipment moves into the new network site geographic region based on the comparison of the quality of service of the user equipment if the user equipment were to connect to the new network site with the altered feature or characteristic of the operating parameter of the new site to the quality of service of the user equipment if the user equipment were to connect to the new network site without altering the feature or characteristic of the operating parameter of the new network site.

10. A system for managing a telecommunications network, comprising:
a user equipment having an associated user behavior profile, the user behavior profile including a record of an interaction of the user equipment with a network service of the telecommunications network;
a user optimization module programmed to:
receive the user behavior profile associated with the user equipment and a current network site profile for a current network site to which the user equipment is coupled,
detect or predict the user equipment is moving towards a new network site geographic region, the new network site having a new network site profile,
in response to detecting or predicting that the user equipment is moving towards the new network site geographic region, acquire the new network site profile,
compare the user behavior profile to the new network site profile and the current network site profile,
based on the comparison of the user behavior profile to the new network site profile and the current network site profile, identify a feature or characteristic of an operating parameter of the new network site to alter,
generate an instruction to cause the new network site to alter the identified feature or characteristic of the operating parameter of the new network site before or as the user equipment moves from a geographic region of the current network site into the new network site geographic region.

11. The system of claim 10, further comprising a backend network having a behavior profile module programmed to generate and maintain the user behavior profile.

12. The system of claim 11, wherein the backend network further includes a user behavior profile algorithm programmed to weight or rank the record and to generate or update the user behavior profile based on the weighted or ranked record.

13. The system of claim 12, wherein the record is weighted or ranked based on one or more of how recent the record is, the location or route associated with the record, a similarity with other records, or time of the interaction.

14. The system of claim 12, wherein the user behavior profile is updated by the user behavior profile algorithm at a pre-determined time, pre-determined intervals, or pre-determined service conditions.

15. The system of claim 10, wherein the record of the user behavior profile includes:
location information of interaction of the user equipment with the current network site, network services information of the interaction of the user equipment with the current network site, and
quality of service information of the interaction of the user behavior profile, the quality of service information determined based on a metric of the coupling of the user equipment to the current network site.

16. The system of claim 15, wherein the quality of service information of the interaction of the user equipment with the current network site includes average latency, minimum latency, maximum latency, median latency, throughput, setup rate, or drop rate.

17. The system of claim 10, wherein the user optimization module further includes a feedback mechanism programmed to update the user behavior profile based on a trend in quality of service information related to multiple interactions over time between the user equipment and the current network site.

18. The system of claim 10, wherein the user optimization module is further programmed to determine an anticipated network service the user equipment is anticipated to request when the user equipment interacts with the new network site, the anticipated network service determined based on an analysis of the user behavior profile.

19. The system of claim 10, wherein the user optimization module is further programmed to calculate an amount of change by which the operating parameter of the new network site is to be altered, and wherein the instruction includes the amount of change.

20. The network of claim 19, wherein the user optimization module is further programmed to generate the instruction to cause the new network site to alter the identified feature or characteristic of the operating parameter of the new network site by the amount of change.

\* \* \* \* \*